United States Patent
Okamoto

(10) Patent No.: US 11,917,290 B2
(45) Date of Patent: Feb. 27, 2024

(54) PHOTOELECTRIC CONVERSION DEVICE, IMAGE PICKUP APPARATUS, CONTROL METHOD, AND STORAGE MEDIUM

(71) Applicant: CANON KABUSHIKI KAISHA, Tokyo (JP)

(72) Inventor: Satoshi Okamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/885,657

(22) Filed: Aug. 11, 2022

(65) Prior Publication Data
US 2023/0064794 A1 Mar. 2, 2023

(30) Foreign Application Priority Data
Aug. 26, 2021 (JP) .................... 2021-138319

(51) Int. Cl.
*H04N 23/65* (2023.01)
*H04N 23/71* (2023.01)
*H04N 25/75* (2023.01)

(52) U.S. Cl.
CPC ........... *H04N 23/651* (2023.01); *H04N 23/71* (2023.01); *H04N 25/75* (2023.01)

(58) Field of Classification Search
CPC ...... H04N 23/651; H04N 23/71; H04N 25/75; H04N 25/47
See application file for complete search history.

(56) References Cited

U.S. PATENT DOCUMENTS

| | | | |
|---|---|---|---|
| 2002/0140842 A1* | 10/2002 | Olding | H04N 23/70 348/E5.034 |
| 2005/0030412 A1* | 2/2005 | Nakayama | H04N 23/667 348/E5.081 |
| 2012/0057059 A1* | 3/2012 | Eldesouki | H01L 27/14601 348/E5.091 |
| 2015/0163429 A1 | 6/2015 | Dai | |
| 2021/0072076 A1* | 3/2021 | Tachino | G01J 1/0228 |
| 2022/0155153 A1* | 5/2022 | Zhu | G01J 1/44 |
| 2022/0166925 A1* | 5/2022 | Nakagawa | B60R 1/00 |

\* cited by examiner

*Primary Examiner* — Sinh Tran
*Assistant Examiner* — Gabriel A Pena Rodriguez
(74) *Attorney, Agent, or Firm* — Cowan, Liebowitz & Latman, P.C.

(57) ABSTRACT

In order to realize a photoelectric conversion device having a photoelectric conversion element for outputting a signal according to the incidence of a photon that has a low power consumption, the photoelectric conversion device includes: at least one pixel including a photoelectric conversion element that outputs a signal according to an incident photon; a photon counter that measures the number of photons incident to the pixel; a time counter that measures a time until the photon counter reaches a first threshold after starting measurement and outputs the measured time as a pixel value; and a first threshold changing unit configured to change the first threshold.

12 Claims, 9 Drawing Sheets

PHOTOELECTRIC CONVERSION DEVICE, IMAGE PICKUP APPARATUS, CONTROL METHOD, AND STORAGE MEDIUM

BACKGROUND OF THE INVENTION

Field of the Invention

The present invention relates to a photoelectric conversion device that includes a photoelectric conversion element that outputs signals according to incident photons, an image pickup apparatus, a control method, a storage medium, and the like.

Description of the Related Art

In recent years, image pickup apparatuses provided with a CMOS photoelectric conversion device have been widely used. In contrast, a photoelectric conversion device that digitally counts the number of photons that are incident to an avalanche photodiode and outputs the counted value as a photoelectrically converted digital signal from a pixel has been proposed.

The U.S. Patent Publication No. 2015/0163429 proposes a configuration in which a time counter that measures time is provided in addition to a photon counter that counts photons. The time counter measures time until the number of photons reaches a predetermined value after the photon counter starts the measurement and calculates a pixel value based on the measured time. The time for measuring photons is different for each pixel, and as a result, an image having a high dynamic range can be acquired.

However, photoelectric conversion devices that use avalanche photodiodes have a disadvantage in which when more photons are incident per unit time, the number of times that avalanche multiplication occurs increases, resulting in an increase in power consumption. In U.S. Patent Publication No. 2015/0163429, since many pixels allow photons to enter a first threshold, the power consumption of the photoelectric conversion device is greater than necessary.

One of object of the present invention is to provide a low-power-consumption photoelectric conversion device that has a photoelectric conversion element that outputs signals according to the incidence of photons, leading to a reduction of the above disadvantage.

SUMMARY OF THE INVENTION

One of aspects of the present invention relates to a photoelectric conversion device comprises: at least one pixel including a photoelectric conversion element that outputs a signal according to an incident photon; a photon counter that measures the number of photons incident to the pixel; a time counter that measures a time until the photon counter reaches a first threshold after starting measurement and outputs the measured time as a pixel value; and at least one processor or circuit configured to function as a first threshold changing unit configured to change the first threshold.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
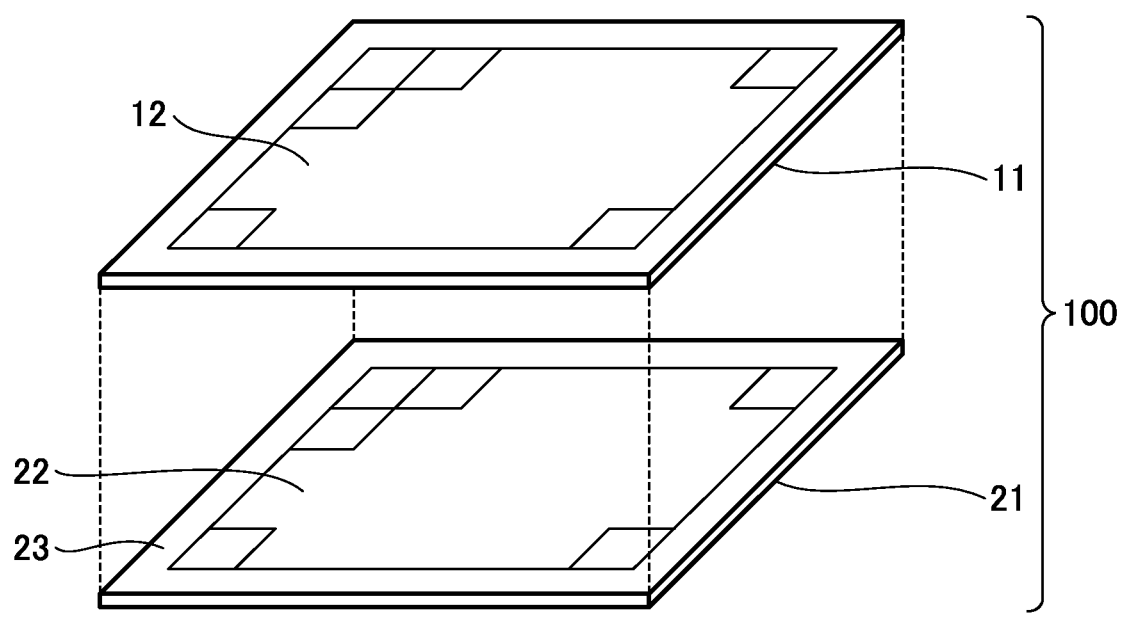
FIG. 1 illustrates a configuration of a photoelectric conversion device according to the first embodiment.

FIG. 1 illustrates a configuration of a photoelectric conversion device according to the first embodiment.

A photoelectric conversion device (photoelectric conversion element) 100 is configured by laminating and electrically connecting two chips of a sensor chip 11 and a circuit chip 21. The sensor chip 11 includes a pixel region 12. The circuit chip 21 includes a pixel circuit region 22 for processing signals detected in the pixel region 12 in parallel, and a peripheral circuit region 23 for controlling the readout of signals from the pixel circuit region 22 and the operation of the pixel circuit region 22.

Figure 2:
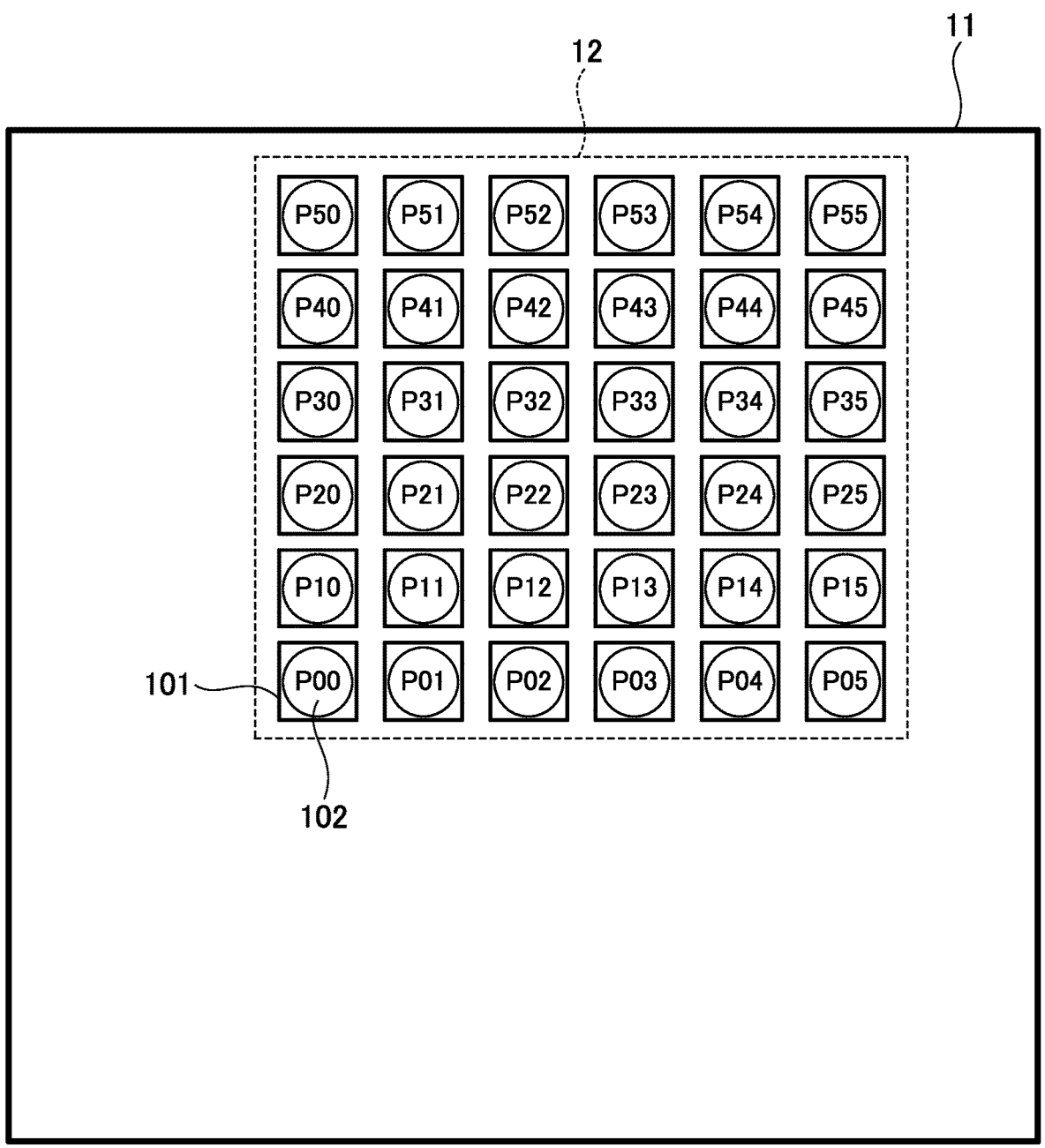
FIG. 2 illustrates an example of a configuration of a sensor chip according to the first embodiment.

FIG. 2 illustrates an example of a configuration of the sensor chip 11 according to the first embodiment. The pixel region 12 of the sensor chip 11 includes a plurality of pixels 101 that are arranged two-dimensionally. That is, the pixel region 12 includes a plurality of pixels 101, and the pixels are arranged in a plurality of rows and columns. Each of the pixels 101 includes a photoelectric conversion element 102 that includes an avalanche photodiode (hereinafter, referred to as "APD") that outputs a signal according to an incident photon.

In FIG. 2, 36 pixels 101, which are arranged in six rows from the zeroth row to the fifth row and in six columns from the zeroth column to the fifth column, are shown with reference numerals that indicate the row numbers and the column numbers. For example, the pixels 101 that are arranged in the first row and the fourth column are denoted by "P14". The number of rows and columns of the pixels 101 that configure the pixel region 12 is not limited to the example shown in FIG. 2.

Figure 3:
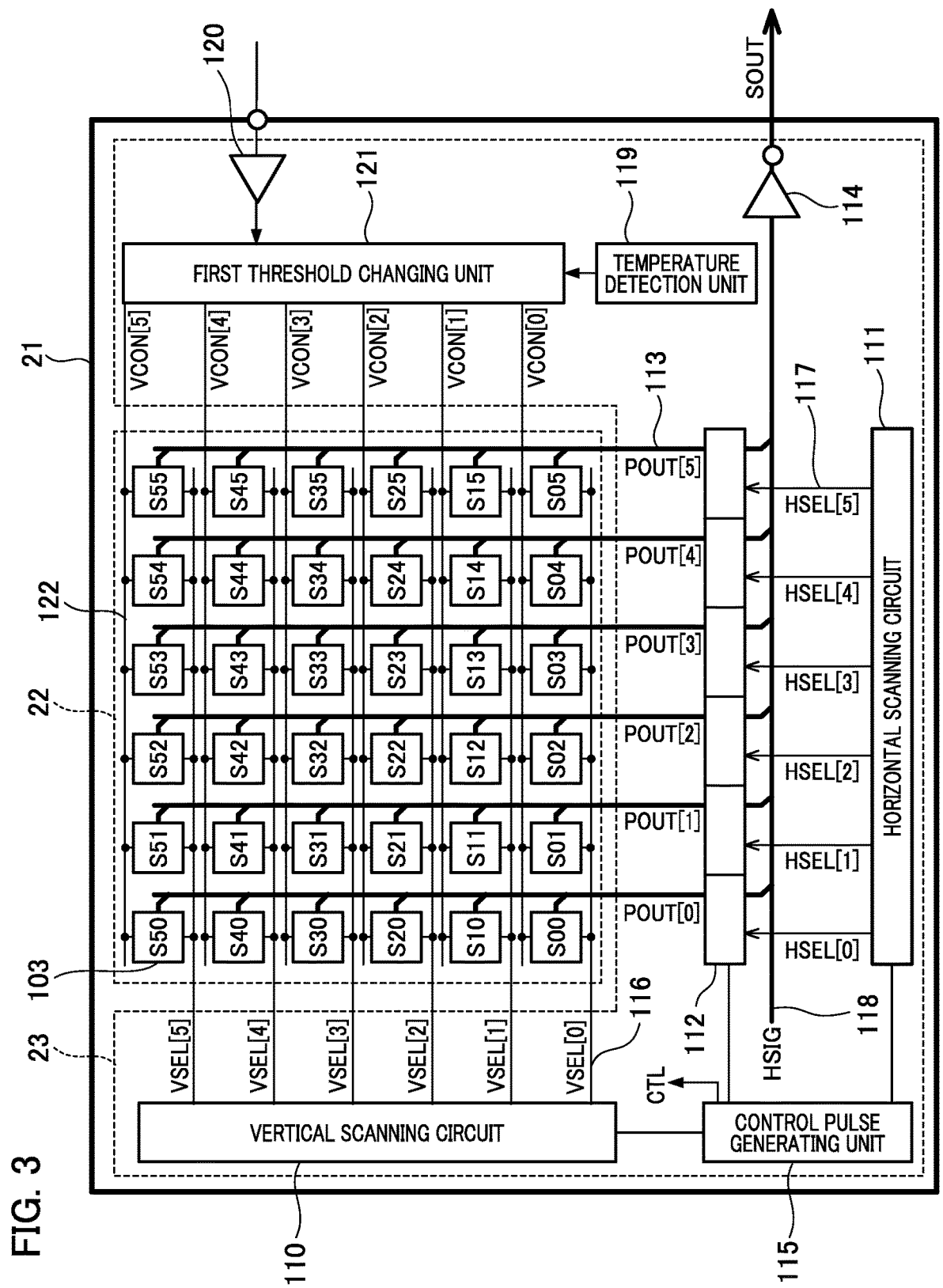
FIG. 3 is a block diagram showing an example of a configuration of a circuit chip according to the first embodiment.

FIG. 3 is a block diagram showing an example of a configuration of the circuit chip 21 according to the first embodiment. The circuit chip 21 includes the pixel circuit region 22 and the peripheral circuit region 23. The pixel circuit region 22 includes a plurality of signal processing units 103 that are composed of a plurality of rows and a plurality of columns and are two-dimensionally arranged.

FIG. 3 illustrates 36 signal processing units 103 that are arranged in six rows from the zeroth row to the fifth row and in six columns from the zeroth column to the fifth column, with reference numerals that indicate the row numbers and column numbers. For example, the signal processing units 103 that are arranged in the first row and the fourth column are denoted by "S14".

Each of the signal processing units 103 is electrically connected to a pixel 101 with a corresponding row number and column number in the sensor chip 11. The number of rows and columns of the signal processing units 103 that configure the pixel circuit region 22 is not limited to the example in FIG. 3 and may be a number that corresponds to the number of rows and columns of the pixels 101 of the sensor chip 11.

The peripheral circuit region 23 includes a vertical scanning circuit 110, a horizontal scanning circuit 111, a column circuit 112, a horizontal output circuit 114, a control pulse generating unit 115, a horizontal output line 118, a temperature detection unit 119, and a first threshold changing unit 121.

Vertical selection lines 116 are wired to the signal processing units 103 in each row in the pixel circuit region 22 in a first direction (horizontal direction in FIG. 3). The vertical selection lines 116 are respectively connected to the signal processing units 103 that are arranged in the first direction. The first direction may be referred to as a row direction or a horizontal direction.

In FIG. 3, the vertical selection lines 116 are shown with reference numerals that indicate the row numbers. For example, the vertical selection line 116 in the first row is denoted by "VSEL [1]". The vertical selection lines 116 in each row are connected to the vertical scanning circuit 110, and the vertical scanning circuit 110 supplies the vertical selection signals VSEL for selectively driving the signal processing units 103 in a predetermined row to the signal processing units 103 via the vertical selection lines 116.

Vertical signal lines 113 are wired to the signal processing units 103 in each column of the pixel circuit region 22 in a second direction (vertical direction in FIG. 3) that is orthogonal to the first direction. The vertical signal lines 113 are respectively connected to the signal processing units 103 that are arranged in the second direction. The second direction may be denoted by a column direction or a vertical direction.

In FIG. 3, the vertical signal lines 113 are shown with reference numerals that indicate the column numbers. For example, the vertical signal lines 113 in the fourth column are denoted by "POUT [4]". The vertical signal lines 113 in each column include n signal lines for outputting an n-bit digital signal.

In each row of the signal processing unit 103 in the pixel circuit region 22, a control line 122 for controlling the first threshold is wired from the first threshold changing unit 121, and the control lines 122 are respectively connected to the signal processing units 103 being arranged in the first direction. In FIG. 3, the control lines 122 are shown together with reference numerals indicating row numbers. For example, the control line 122 in the first row is denoted by "VCON [1]".

In the present embodiment, there is a feature in which the first threshold changing unit 121 for changing the first threshold is provided. In the present embodiment, there is also a feature in which the first threshold changing unit 121 can change the first threshold by using a predetermined control signal.

The horizontal scanning circuit 111 supplies horizontal selection signals for reading out signals from the column circuit 112 to the column circuit 112 via a horizontal selection line 117. Upon receiving the horizontal selection signals from the horizontal scanning circuit 111, the column circuit 112 outputs the output signals that are temporarily held to the horizontal output circuit 114 via a signal line 118.

In FIG. 3, the horizontal selection lines 117 are shown with reference numerals that indicate the column numbers. For example, the horizontal selection line 117 in the fourth column is denoted by "HSEL [4]". The horizontal output line 118 includes n signal lines for outputting n-bit digital signals.

The horizontal output circuit 114 outputs a signal according to a pixel signal that serves as an output signal SOUT of the photoelectric conversion device. The control pulse generating unit 115 supplies control pulse signals for controlling the operation of the vertical scanning circuit 110, the horizontal scanning circuit 111, and the column circuit 112 and the timing thereof, and a control pulse CTL for controlling the operation of the signal processing unit 103.

At least a part of the control pulse signals for controlling the operation of the vertical scanning circuit 110, the horizontal scanning circuit 111, and the column circuit 112 and the timing thereof, and the control pulse CTL for controlling the operation of the signal processing unit 103 may be supplied from outside of the photoelectric conversion device 100.

The temperature detection unit 119 measures the temperature information of the photoelectric conversion device 100 by using a temperature sensor, and outputs the measured temperature to the first threshold changing unit 121 for use as environmental information. The temperature sensor of the temperature detection unit 119 measures the temperature based on, for example, temperature characteristics of a silicon diode. A signal input circuit 120 inputs signals to the first threshold changing unit 121 from outside of the photoelectric conversion device 100 and controls the operation of the first threshold changing unit 121.

In the temperature detection unit 119, for example, a dark current level obtained from an optical black pixel may be used for the temperature information. The optical black pixel is a light-shielded pixel that is disposed on the periphery of the pixels that are arranged two-dimensionally.

The first threshold changing unit 121 supplies control signals for changing the first threshold in the signal processing units 103 to the signal processing units 103 in row units via the control lines 122 based on signals that have been input from the temperature detection unit 119 or the signal input circuit 120.

In FIG. 3, although the control lines 122 are shared and connected in each row, they may be separately connected to each signal processing unit 103 or may be separately connected to each predetermined region including a plurality of signal processing units 103.

Figure 4:
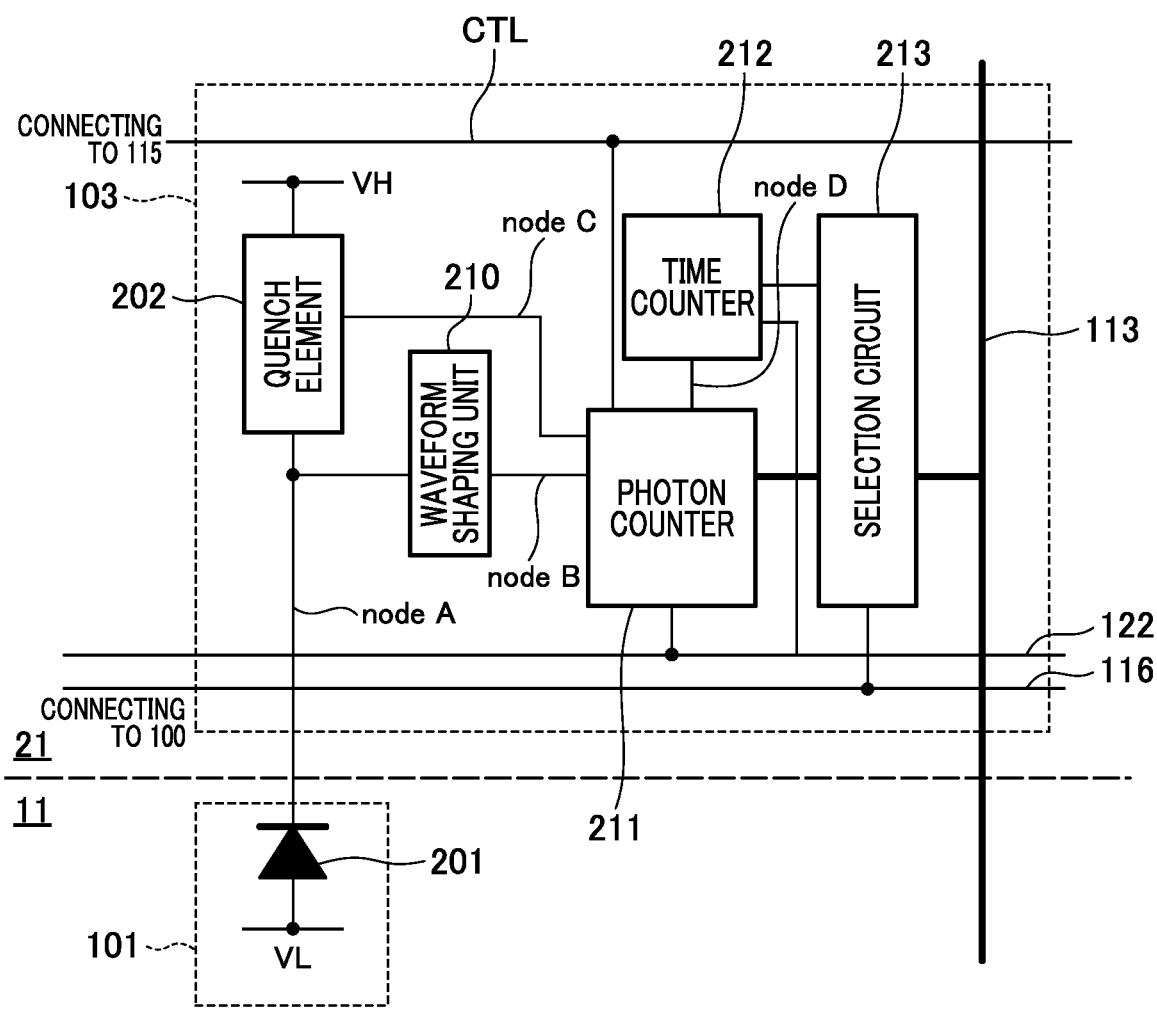
FIG. 4 illustrates an equivalent circuit diagram of pixels 101 and signal processing units 103 according to the first embodiment.

FIG. 4 is an equivalent circuit diagram of the pixel 101 and the signal processing unit 103 according to the first embodiment. The pixel 101 in the sensor chip 11 includes an APD 201 that is a photoelectric conversion element.

When a photon is incident to the APD 201, a charge pair is generated by photoelectric conversion. A voltage VL (first voltage) is supplied to the anode of the APD 201, and a voltage VH (second voltage), which is higher than the voltage VL supplied to the anode, is supplied to the cathode.

That is, reverse bias voltages causing the APD 201 to perform an avalanche multiplication operation are supplied. In a state where such voltages are supplied thereto, the charges generated by the incident light cause avalanche multiplication, and an avalanche current is generated.

There is a Geiger mode in which the potential difference between the anode and the cathode is greater than the breakdown voltage, and a linear mode in which the potential difference between the anode and the cathode is close to or lower than the breakdown voltage.

The APD operated in the Geiger mode is referred to as "SPAD" (Single Photon Avalanche Diode). At this time, the voltage VL (first voltage) is set to, for example, −30 V, and the voltage VH (second voltage) is set to, for example, 1V.

The signal processing unit 103 in the circuit chip 21 includes a quench element 202, a waveform shaping unit 210, a photon counter 211, a time counter 212, and a selection circuit 213.

The quench element 202 is connected to a power supply that supplies the voltage VH and the APD 201. The quench element 202 has a function that replaces the change in the avalanche current caused by the APD 201 with a voltage signal.

The quench element 202 functions as a load circuit (quench circuit) when the signals are multiplied due to the avalanche multiplication, and has a function that controls the voltage supplied to the APD 201 and controlling the avalanche multiplication (quench operation).

Additionally, the quench element can switch between the ON state and the OFF state using the control signal node C from the photon counter 211. When the control signal node C is set to the LOW level, the quench element 202 is turned ON to enable the avalanche multiplication of the APD 201.

When the quench element 202 is turned OFF, the cathode of the APD enters a floating state and the avalanche multiplication of the APD 201 can be stopped, resulting in suppression of the power consumption.

The waveform shaping unit 210 shapes the potential change in the cathode of the APD 201 that is obtained during photon detection, and outputs pulse signals. For example, an inverter circuit and a buffer circuit are used as the waveform shaping unit 210.

The reference numeral 211 denotes a photon counter that measures the number of photons incident to the pixel and counts the pulse signals that have been output from the waveform shaping unit 210 up to a first threshold. The first threshold can be changed by a control signal that is input via the control line 122.

In the present embodiment, the control signal for changing the first threshold is, for example, a predetermined pulse code. The upper limit of the count by the photon counter 211 may be changed by supplying this predetermined pulse code or the like to serve as the control signal to the control line 122.

The control signal for changing the first threshold may be, for example, an analog voltage value. In that case, a control signal line for changing the first threshold may be provided separately. Additionally, the photon counter 211 resets the count value when a HIGH level control signal PRES is supplied via the control line 122.

The time counter 212 is a counter that measures a time until a measured value of the photon counter reaches the first threshold after the photon counter starts the measurement and outputs the measured value as a pixel value.

The time counter 212 starts counting when the count value is reset by a HIGH level control signal PRES supplied from the control line 122, the control signal PRES becomes a LOW level, and the reset is canceled. In contrast, the end of the count is controlled by the control signal node D from the photon counter 211.

When the control signal node D at the end timing is input from the photon counter 211, the value counted by the time counter 212 is output to a selection circuit 213. In contrast, when a signal at the end timing is not input even when the time measured by the time counter 212 reaches the second threshold, the number of photons (count value) measured by the photon counter 211 is output as a pixel value to the selection circuit 213.

The selection circuit 213 switches electrical connection and disconnection between the photon counter 211, the time counter 212, and the vertical signal line 113 based on the vertical selection signals VSEL supplied from the vertical scanning circuit 110 in FIG. 3 via the vertical selection lines 116. The selection circuit 213 includes, for example, a buffer circuit for outputting signals.

In the present embodiment, the second threshold is fixed. However, for example, a pulse code that is different from the predetermined pulse code for changing the first threshold or an analog voltage value may be used as the control signals to be supplied to the control line 122.

Thus, the upper limit of the count (second threshold β) by the time counter 212 may be changed. For example, in the case of capturing a high-speed object, the control may be performed so that the upper limit of the count (second threshold) performed by the time counter 212 is lowered to suppress object blur.

Figure 5:
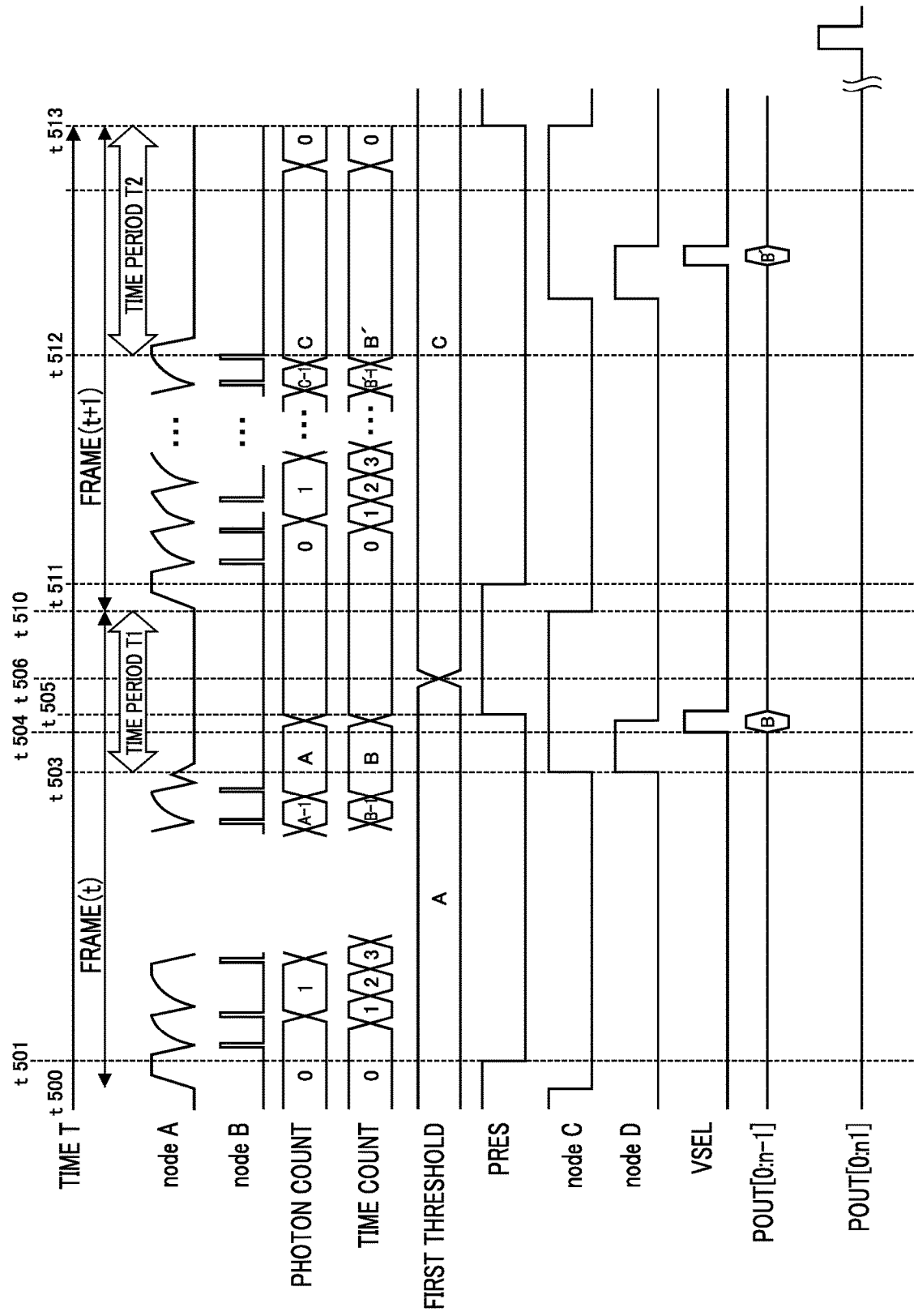
FIG. 5 is a timing chart showing the operation of the photoelectric conversion device according to the first embodiment.

FIG. 5 is a timing chart showing the operation of the photoelectric conversion device according to the first embodiment. In the following, the operation of the pixel P00 from among the plurality of pixels 101 will be described. Note that, in order to simplify the description, it is assumed that the camera parameters related to the image capturing environment and image pickup are invariant and the light transmitted through the lens and received by the sensor is always constant. The second threshold β of the time counter is assumed to be fixed regardless of the first threshold.

FIG. 5 shows a timing chart corresponding to two frames from among a plurality of frames that configures a video signal. The time period from the timing t500 to the timing t510 corresponds to the t-th frame FRAME (t). The time period from the timing t510 to the timing t513 corresponds to the t+1st frame FRAME (t+1).

In the FRAME (t), the photon counter 211 reaches the first threshold A before it is changed in the frame, and the count value B of the time counter is output to the selection circuit 213. In the FRAME (t+1), the photon counter 211 reaches the first threshold C after it is changed in the frame and the count value B' of the time counter is output to the selection circuit 213.

If the first threshold is A>C, the relation between the values of the time counters in each of the frames is (β>) B>B'. Although the description will be omitted here, in the FRAME (t+n), if the photon counter 211 has not reached the first threshold, the count value of the photon counter at the time point when the time counter has reached the second threshold β is output to the selection circuit 213.

First, at the timing t500, the control signal node C is set to the LOW level so as to put the quench element 202 into the ON state, thereby causing the APD 201 to transition to the Geiger mode.

At the timing t501, in the state in which the transition of the APD 201 to the Geiger mode is completed, the control signal PREST is set to the LOW level via the control line 122. Accordingly, the reset of the photon counter 211 and the time counter 212 is canceled, and the counting of the photon counter 211 and the time counter 212 starts.

At the timing t503, when the photon counter 211 reaches the first threshold A, the control signal node D is transitioned to High by the photon counter 211. Accordingly, the photon counter 211 and the time counter 212 stop counting.

Additionally, at this time, the control signal node C is set to High by the photon counter 211 and the quench element 202 is put into the OFF state. Accordingly, the avalanche multiplication operation by the APD 201 stops so as to suppress power consumption.

At the timing t 504, the vertical selection signal VSEL is set to High via the vertical selection lines 116, and the value B of n−1 bits counted by the time counter 212 is output to POUT [0] of the vertical signal line 113 to serve as the signal of the n−1 bit.

Additionally, the n-th bit is set to 0 and the value is output to POUT [0] of the vertical signal line 113 as the signal of n-th bit. The value of the n-th bit functions as an additional signal and indicates whether or not the photon counter 211 has reached the first threshold, wherein 0 indicates that the photon counter 211 has reached the first threshold, and 1 indicates that the photon counter 211 has not reached the first threshold.

That is, when the number of photons measured by the photon counter is a pixel value, a predetermined additional signal 1 is added. Note that the format of the additional signal is not limited thereto, and 0 may be used when the photon counter 211 has not reached the first threshold, and 1 may be used when the photon counter 211 has reached the first threshold, or an additional signal may be output using another signal line.

At the timing t505, PREST is set to High via the control line 122, and the count values of the photon counter 211 and time counter 212 are reset. At the timing t506, the first threshold changing unit 121 changes the first threshold from A to C so that power consumption of the photoelectric conversion device 100 is reduced.

First, at the timing t510, the control signal node C is set to the LOW level so as to put the quench element 202 into the ON state, thereby causing the APD 201 to transition to the Geiger mode.

At the timing t511, in the state in which the transition of the APD 201 to the Geiger mode is completed, the control signal PRES is set to the LOW level and the counting of the photon counter 211 and the time counter 212 starts. At the timing t512, the photon counter reaches a first threshold C.

At this time, as described above, the control signal node D is transitioned to High by the photon counter 211. The control signal node C is set to High to put the quench element 202 into the OFF state. At this time, from among the power consumption before and after the first threshold is changed, that for which the time period during which the avalanche multiplication operation by the APD 201 is stopped is longer is suppressed.

Specifically, the power consumption is suppressed during each of the time periods T1 (from t503 to t510) in the FRAME (t) and T2 (from T512 to T513) in the FRAME (t+1). However, since T2>T1 is defined, power consumption can be reduced by further lowering the first threshold.

At the timing t513, the control signal PREST is set to High and the photon counter 211 and the time counter 212 are reset.

Note that t500, t501, t504, t505, t506, t510, t511, t512, and t513 are respectively timings of constant cycles, and t500 to t510, t501 to t511, t504 to t512, and t505 to t513 respectively correspond to one vertical time period.

Note that in FRAME (t+n), a case will be described in which the photon counter does not reach the first threshold before the time counter reaches the second threshold β. At the timing of the second threshold β after resetting the time counter, the vertical selection signal VSEL is set to High by the time counter.

However, at this point, the count value of the photon counter has not reached the first threshold, and node C and node D remain LOW. Accordingly, the value A' of the n−1 bit counted by the photon counter 211 is output to the POUT [0] of the vertical signal line 113 to serve as the signal of the n−1 bit.

Additionally, the value of the n-th bit is set to 1, and the value is output to POUT [0] of the vertical signal line 113 to serve as the signal of the n-th bit. That is, if the number of photons measured by the photon counter is a pixel value, a predetermined additional signal 1 is added, as described above.

As described above, when the photon counter 211 reaches the first threshold from the pixel P00 for each frame, the count value of the time counter is output to the selection circuit 213.

If the photon counter 211 has not reached the first threshold, the count value of the photon counter is output to the selection circuit 213. The signals of each of the pixels in the pixel region 12 are read out in the order of P00 to P05, P10 to P15, ... P50 to P55 from the left side in FIG. 2 for every row from zero to five.

Figure 6:
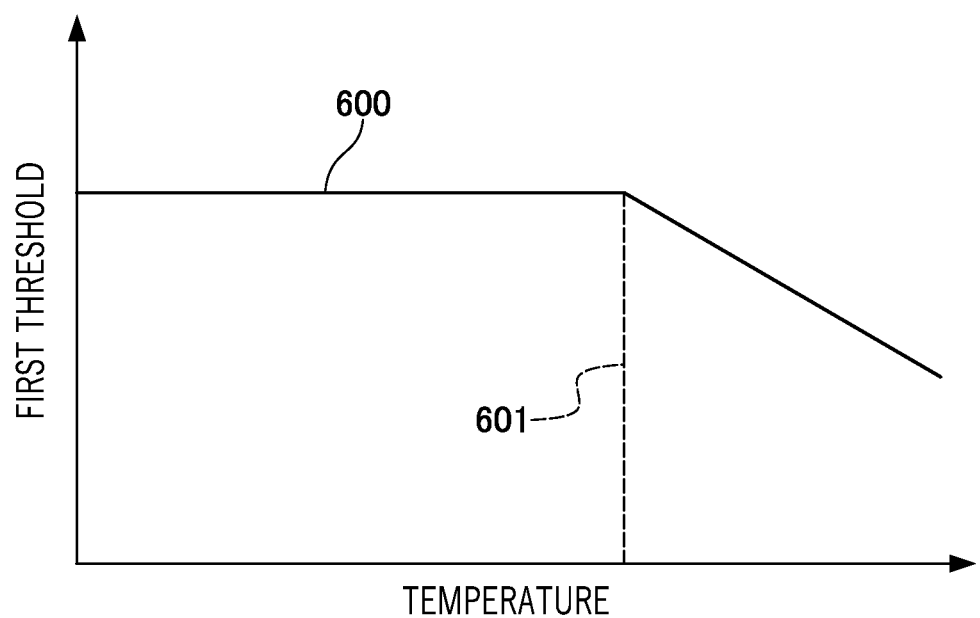
FIG. 6 is a graph showing the relation between the temperature and a first threshold in a first threshold changing unit according to the first embodiment.

FIG. 6 is a graph showing the relation between the temperature and the first threshold in the first threshold changing unit according to the first embodiment, the vertical axis shows a temperature measured by the temperature detection unit 119, and the horizontal axis shows the first threshold. As shown in a graph 600, there is a characteristic in which the first threshold is fixed up to a temperature 601, and, after the temperature 601, the first threshold lowers as the temperature increases.

As described above, in the first embodiment, the first threshold changing unit 121 changes the first threshold as shown in the graph of FIG. 6 based on the temperature, which is used as the environmental information, that has been detected by the temperature detection unit 119, so as to suppress the power consumption. For example, as shown in FIG. 6, the first threshold is made gradually lower as the temperature detected by the temperature detection unit 119 increases.

Specifically, when the temperature, which is used as the environmental information, that has been detected by the temperature detection unit 119 is higher than the predetermined threshold, the first threshold changing unit 121 sets the first threshold to be lower compared to the case in which the temperature is equal to or lower than the predetermined threshold. Performing the control in such a manner results in reducing the power consumption in the photoelectric conversion device 100, and results in the stable operation of the device for an extended period even in an environment in which the temperature is high.

Figure 7:
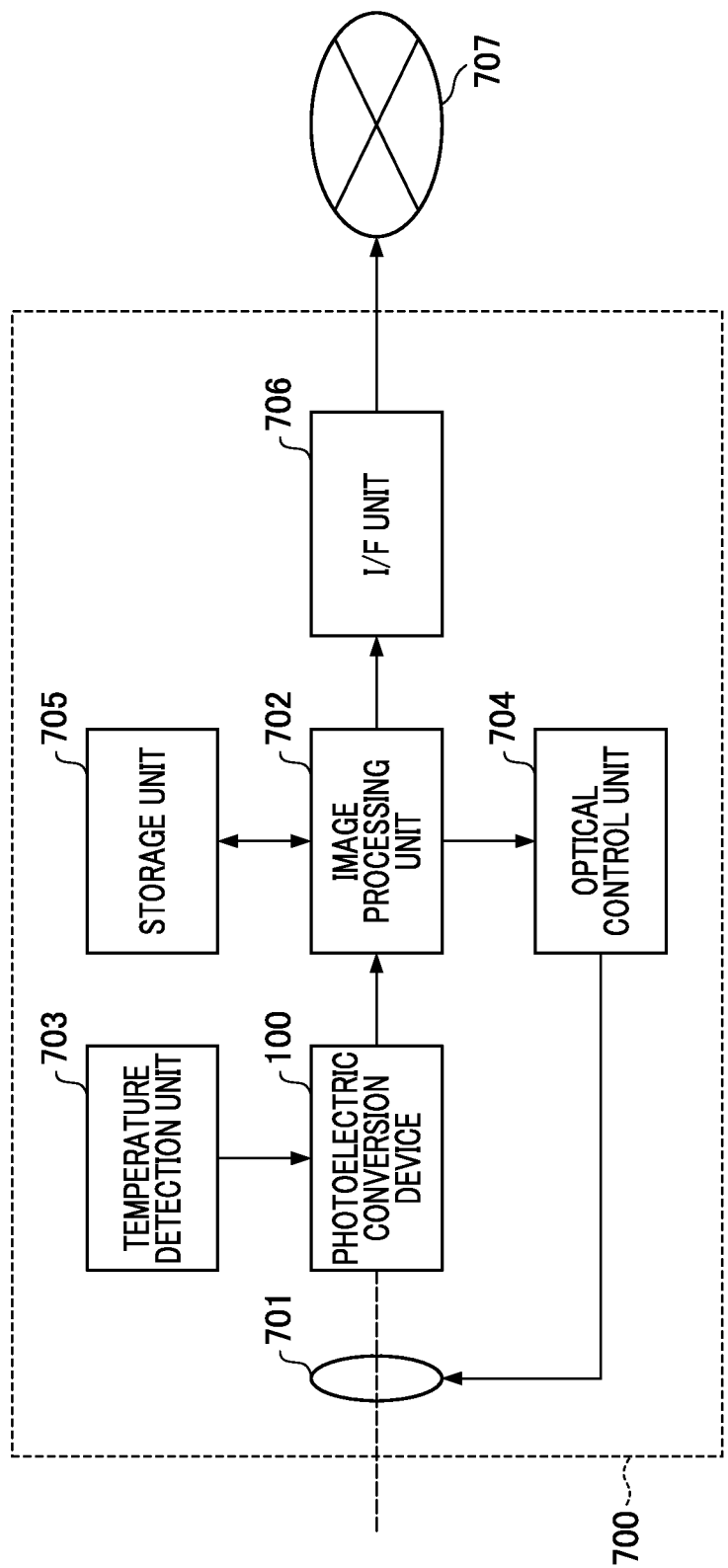
FIG. 7 is a block diagram of an image pickup apparatus according to the first embodiment.

FIG. 7 is a block diagram of an image pickup apparatus 700 according to the first embodiment. The image pickup apparatus 700 is an image pickup apparatus such as a digital camera including the photoelectric conversion device 100, and includes a lens 701, an image processing unit 702, a temperature detection unit 703, an optical control unit 704, a storage unit 705, and an I/F unit 706 serving as a communication unit.

The lens 701 includes a focus lens, a zoom lens, a diaphragm, and the like, forms an optical image of an object, and makes the optical image that has been formed become incident to the imaging surface of the photoelectric conversion device 100.

In the photoelectric conversion device 100, an optical image formed by the lens 701 is captured. In the image processing unit 702, processing such as signal rearrangement, correction of defective pixels, noise reduction, color conversion, white balance correction, gamma correction, and data compression are performed on the signals that have been read out from the pixel region 12 of the photoelectric conversion device 100, and image signals are generated.

A CPU serving as a computer is incorporated into the image processing unit 702 and functions as a control unit that controls the operation of each unit of the entire image pickup apparatus 700 based on a computer program that is stored in a memory serving as a storage medium.

Furthermore, according to the present embodiment, in the image processing unit 702, the image processing that is performed with respect to a pixel value to which the predetermined additional signal is added, and the image processing performed with respect to a pixel value to which the additional signal is not added are different.

Specifically, a higher noise reduction is applied to pixel values to which 1, which is a predetermined additional signal and indicates the value of the n-th bit, is added, in comparison to pixel values to which the additional signal is not added.

The temperature detection unit 703 includes a semiconductor temperature sensor, for example, a thermistor and a silicon diode for detecting the temperature information that is used as the environmental information, and is disposed in the vicinity of the photoelectric conversion device 100.

Note that although the temperature detection unit 119 shown in FIG. 3 is provided on the circuit chip 21 in the photoelectric conversion device 100, the temperature detection unit 703 in FIG. 7 is also provided in the vicinity of the photoelectric conversion apparatus 100 at a position separate from the photoelectric conversion device 100.

The temperature information that serves as environmental information detected by the temperature detection unit 703 is output to the photoelectric conversion device 100. The photoelectric conversion device 100 changes the first threshold based on the temperature information detected by the temperature detection unit 703, according to, for example, the characteristics shown in the graph in FIG. 6. The optical control unit 704 performs the control of a focus lens, a zoom lens, a diaphragm, and the like that are provided in the lens 701.

The storage unit 705 includes a recording medium such as a memory card, a hard disk, and the like. The I/F (Interface) unit 706 serving as a communication unit transmits an image signal generated by the image processing unit 702 to outside of the image pickup apparatus 700, for example, via the network 707, and receives signals from the outside.

The I/F unit 706 includes a plurality of routers, switches, cables, and the like that meet a communication standard, for example, Ethernet®, and allows a client to control the image pickup apparatus 700 via the network 707.

As described above, in the first embodiment, a first threshold changing step for changing a first threshold in the photoelectric conversion device 100 based on the temperature information, which is used as the environmental information, detected by the temperature detection unit 703 provided in the vicinity of the photoelectric conversion device 100 to suppress power consumption is provided. For example, when the temperature detected by the temperature detection unit 604 is high, the power consumption of the photoelectric conversion device 100 is suppressed by making the first threshold lower as shown in FIG. 6.

Thus, the image pickup apparatus 700 can continue to capture images even in an environment in which the temperature is high. The first threshold changing step is performed by executing a computer program that is stored in a memory serving as a storage medium by a CPU serving as a computer in the image processing unit 702.

Second Embodiment

Figure 8:
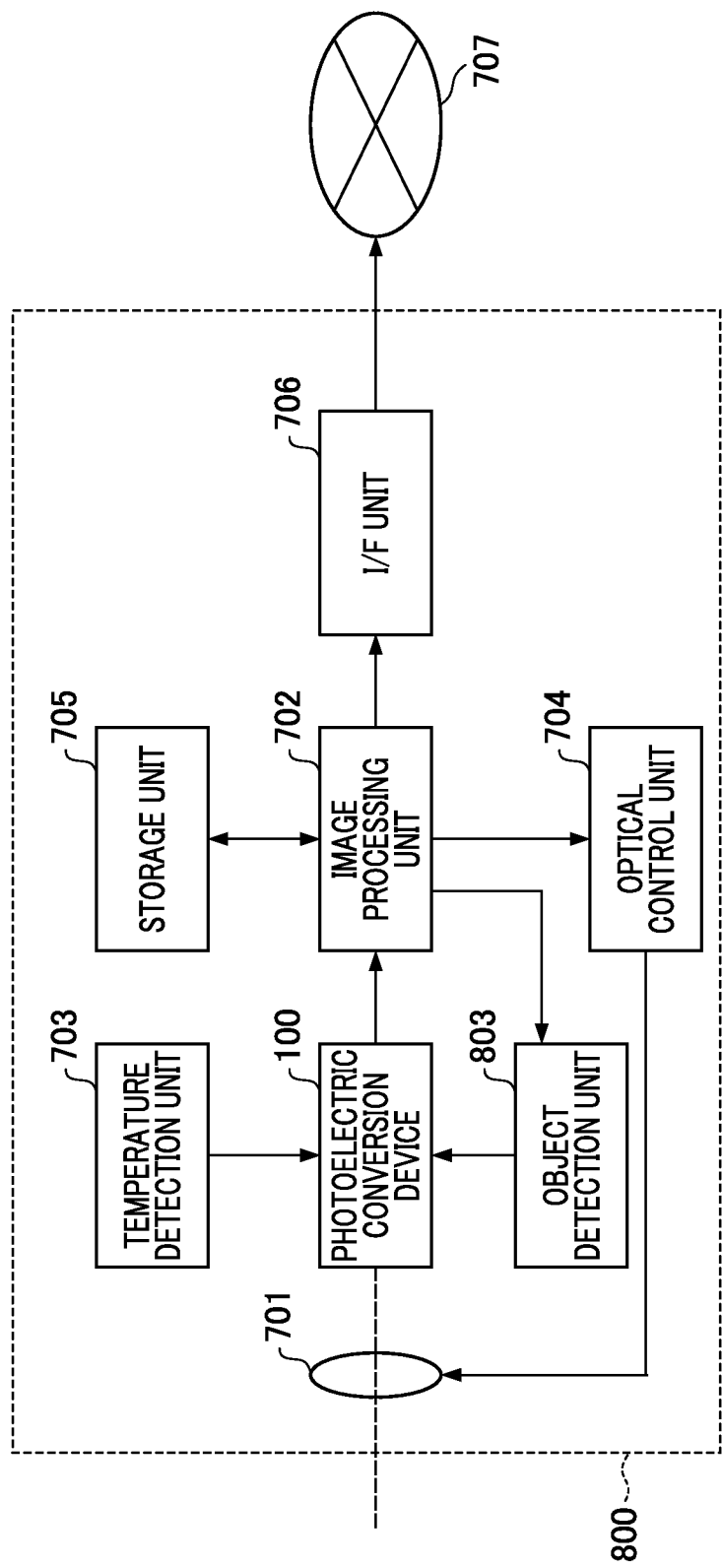
FIG. 8 is a block diagram of the image pickup apparatus according to the second embodiment.

FIG. 8 is a block diagram of the image pickup apparatus 800 according to the second embodiment. In FIG. 8, the image pickup apparatus 800 includes a digital camera, and the like, and differs from the configuration in FIG. 7 in that an object detection unit 803 is added thereto. The same reference numerals are provided for the same parts or components as in FIG. 7, and redundant descriptions will be omitted or simplified.

The object detection unit 803 detects whether or not an object exists in the image generated by the image processing unit 802. That is, the object detection unit 803 detects an object region in which an object exists based on the image signals that have been read out from the pixel region 12 of the photoelectric conversion device 100, for use as the object information. The object region is detected by, for example, processing such as detecting a temporal difference in the background of the image, detecting a motion, and detecting an object.

A first threshold in the photoelectric conversion device 100 is determined for each pixel region based on the results of detection. Additionally, the first threshold changing unit 121 sets the first threshold in the object region higher than the first threshold in the regions other than the object region. Since the first threshold is low in the regions other than the object region, the image noise increases. However, the power consumption of the image pickup apparatus 800 can be suppressed.

The user may also set the region in which the object exists via the network 707, instead of detecting the region by using the object detection unit 803. In that case, the ROI (Region Of Interest), for example, the region in which the user object exists can be freely set, and the object information includes whether or not such a ROI has been set by the user.

Additionally, the photoelectric conversion device 100 changes the first threshold based on the temperature information detected by the temperature detection unit 703 as in the first embodiment.

Figure 9:
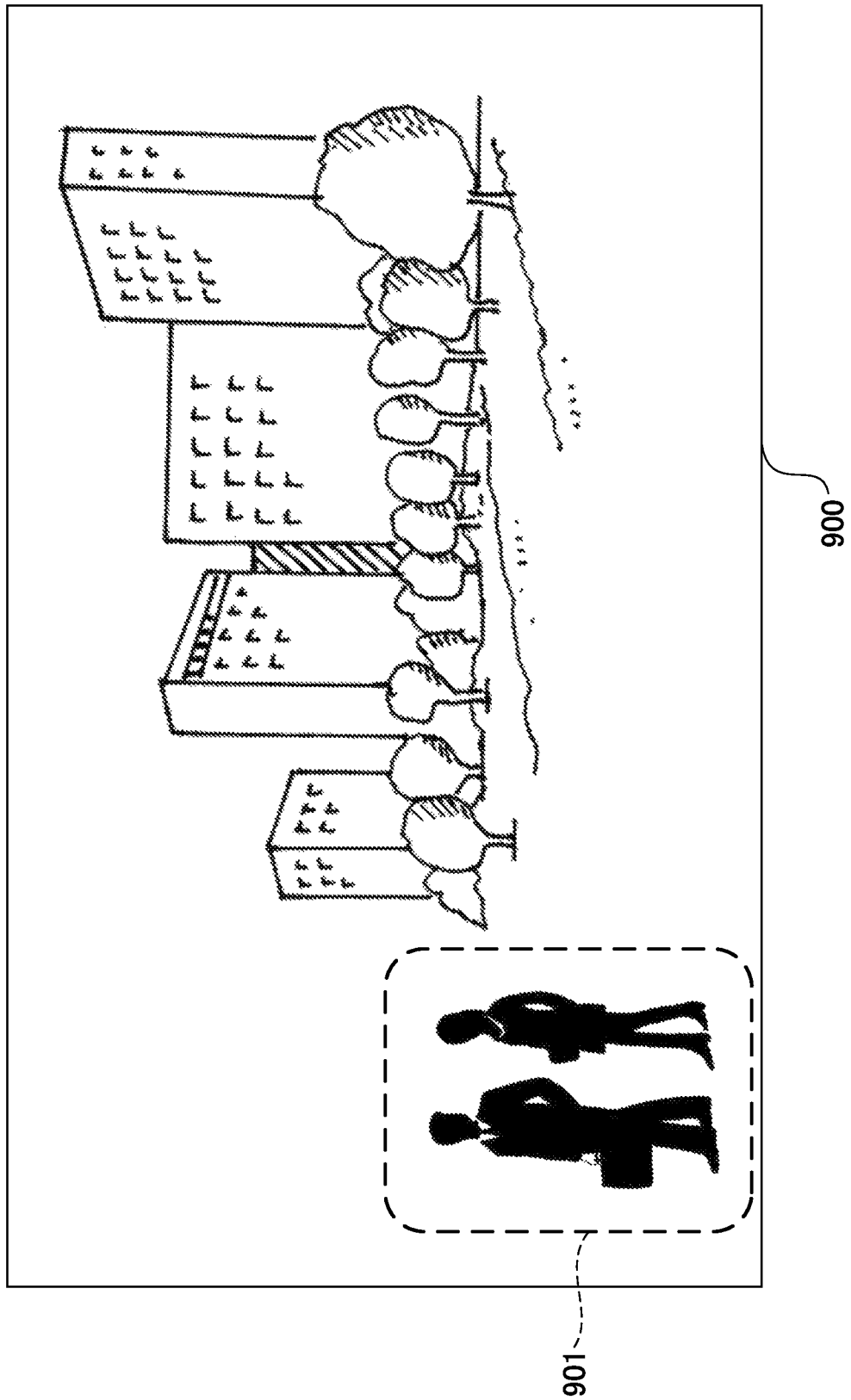
FIG. 9 illustrates an example of a video image captured by an image pickup apparatus 800 according to the second embodiment.

FIG. 9 illustrates an example of a video image captured by the image pickup apparatus 800 according to the second embodiment.

A video image 900 is a video image captured by the image pickup apparatus 800, and the reference numeral 901 denotes a region detected by the object detection unit 803 as an object. In the photoelectric conversion device 100, the first threshold for the pixels of the region 901 is set as high, and the first threshold for the regions other than the region 901 is set as low.

Thus, in the second embodiment, when the temperature is high, the first threshold is changed so as to be made low based on the temperature information that is used as the environment information, the object information (for example, the object region) in the image is detected, and the first threshold for the region in which the object is not detected is made lower.

Accordingly, the power consumption of the image pickup apparatus 800 can be suppressed while maintaining the image quality of the region of important objects in surveillance videos and the like.

For example, although, in the second embodiment, whether or not the object information indicates an object region is used, if a focus adjustment mechanism is provided, the object information may include whether or not the focus for an object is at a predetermined threshold or more.

That is, a first threshold for an object for which the focus is equal to or higher than a predetermined threshold may be set as higher than a first threshold for other objects. Alternatively, the object information may include an object having a relatively high contrast.

Specifically, the first threshold for the object having a relatively high contrast may be set as higher than a first threshold for an object having a relatively low contrast. The object information includes any one of whether or not the object is in an object region, whether or not the focus for the object is at a predetermined threshold or higher, and whether or not the object has a relatively high contrast.

Note that the first threshold changing unit 121 may change the first threshold according to at least one of the temperature information that is used as the environmental information and the object information, instead of changing the first threshold based on both the temperature information and the object information.

Furthermore, if a voltage measuring unit that measures a voltage of a power supply such as a battery, for use as the environmental information, so as to drive the photoelectric conversion device is provided, and the voltage of the battery serving as the power supply is lowered more than a predetermined threshold, the first threshold may be set as low.

Specifically, if a voltage measuring unit that detects a voltage of the power supply of the image pickup apparatus for use as the environmental information is provided and the voltage of the power supply is lower than a predetermined threshold, the first threshold may be set lower compared to the case in which the voltage of the power supply is equal to or higher than the predetermined threshold.

Additionally, in the embodiments, although the examples of the environmental information include the temperature and the voltage of the power supply, the present invention is not limited thereto. The environmental information includes, for example, whether or not the luminance of the object is lower than a predetermined threshold, whether or not a lighting device can be used if the luminance of the object is low, the image capturing mode of the image pickup apparatus, and whether or not the amount of power consumption of the image pickup apparatus is equal to or higher than a predetermined value.

In the embodiments, an example of application to a digital camera, for example, as an imaging device has been described. However, the imaging device includes digital movie cameras, smartphones with cameras, tablet computers with cameras, in-vehicle cameras, drone cameras, cameras mounted on robots, network cameras, and other electronic devices with imaging functions.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the photoelectric conversion device or the image pickup apparatus through a network or various storage media. Then, a computer (or a CPU, an MPU, or the like) of the photoelectric conversion devices or the image pickup apparatus may be configured to read and execute the program. In such a case, the program and the storage medium storing the program configure the present invention.

This application claims the benefit of Japanese Patent Application No. 2021-138319 filed on Aug. 26, 2021, which is hereby incorporated by reference herein in its entirety.

What is claimed is:

1. A photoelectric conversion device comprising:
   at least one pixel including a photoelectric conversion element that outputs a signal according to an incident photon;
   a photon counter that measures the number of photons incident to the pixel;
   a time counter that measures a time until the photon counter reaches a first threshold after starting measurement and outputs the measured time as a pixel value; and
   at least one processor or circuit configured to function as:
   a first threshold changing unit configured to change the first threshold according to a predetermined control signal based on object information; and
   an object detection unit configured to detect an object region based on an image signal that has been read out from a pixel region, wherein the pixel region includes two-dimensionally arranged pixels;
   wherein the first threshold changing unit sets the first threshold for the object region detected by the object detection unit as higher than the first threshold for the regions other than the object region.

2. The photoelectric conversion device according to claim 1, wherein the photoelectric conversion element includes an avalanche photodiode.

3. The photoelectric conversion device according to claim 1, wherein if the number of photons does not reach the first threshold even if the time measured by the time counter reaches the second threshold, the number of photons measured by the photon counter is used as a pixel value.

4. The photoelectric conversion device according to claim 3, wherein if the number of photons measured by the photon counter is used as a pixel value, a predetermined additional signal is added.

5. The photoelectric conversion device according to claim 4, wherein image processing performed on a pixel value to which the predetermined additional signal is added is different from image processing performed on a pixel value to which the predetermined additional signal is not added.

6. The photoelectric conversion device according to claim 5, wherein noise reduction applied to a pixel value to which the predetermined additional signal is added is higher than noise reduction applied to a pixel value to which the predetermined additional signal is not added.

7. The photoelectric conversion device according to claim 1 further comprising at least one processor or circuit configured to function as a temperature detection unit configured to detect a temperature for use as environmental information,
   wherein if the temperature detected by the temperature detection unit is higher than a predetermined threshold, the first threshold changing unit sets the first threshold lower compared to a case in which the temperature is equal to or lower than the predetermined threshold.

8. The photoelectric conversion device according to claim 1, wherein the object information includes any one of whether or not an object region is, whether or not focus for the object is at a predetermined threshold value or more, and whether or not the object has a relatively high contrast.

9. An image pickup apparatus comprising:
a photoelectric conversion device having a pixel including a photoelectric conversion element that outputs a signal according to an incident photon, a photon counter that measures the number of photons incident to the pixel, a time counter that measures a time until the photo counter reaches a first threshold after the photo counter starts measurement and outputs the measured time as a pixel value,
at least one processor or circuit configured to function as:
a first threshold changing unit configured to change the first threshold; and
a voltage measuring unit configured to detect a voltage of a power supply for driving the photoelectric conversion device,
wherein if the voltage of the power supply is lower than a predetermined threshold, the first threshold is set lower compared to a case in which the voltage of the power supply is equal to or higher than the predetermined threshold.

10. An image pickup apparatus comprising:
a photoelectric conversion device having a pixel including a photoelectric conversion element that outputs a signal according to an incident photon, a photon counter that measures the number of photons incident to the pixel, a time counter that measures a time until the photo counter reaches a first threshold after the photo counter starts measurement and outputs the measured time as a pixel value,
at least one processor or circuit configured to function as:
a first threshold changing unit configured to change the first threshold according to a predetermined control signal based on object information;
an object detection unit configured to detect an object region based on an image signal that has been read out from a pixel region, wherein the pixel region includes two-dimensionally arranged pixels;
wherein the first threshold changing unit sets the first threshold for the object region detected by the object detection unit as higher than the first threshold for the regions other than the object region;
an image processing unit configured to process an image that has been read out from the photoelectric conversion device; and
a communication unit configured to externally transmit an image that has been processed by the image processing unit.

11. A control method of a photoelectric conversion device having a pixel including a photoelectric conversion element that outputs a signal according to an incident photon, a photon counter that measures the number of photons incident to the pixel, and a time counter that measures a time until the photon counter reaches a first threshold after starting measurement and calculates a pixel value based on the measured time,
wherein the method comprising,
changing the first threshold for the photoelectric conversion device, according to a predetermined control signal based on object information;
detecting an object region based on an image signal that has been read out from a pixel region, wherein the pixel region includes two-dimensionally arranged pixels;
wherein the changing the first threshold includes setting the first threshold for the object region detected by the detecting the object as higher than the first threshold for the regions other than the object region.

12. A non-transitory computer-readable storage medium configured to store a computer program to control a photoelectric conversion device configured to have a pixel including a photoelectric conversion element that outputs a signal according to an incident photon, and a photon counter that measures the number of photons incident to the pixel, and a time counter that measures a time until the photon counter reaches a first threshold after starting measurement and outputs the measured time as a pixel value,
wherein the computer program comprises instructions for executing following process:
changing the first threshold for the photoelectric conversion device, according to a predetermined control signal based on object information;
detecting an object region based on an image signal that has been read out from a pixel region, wherein the pixel region includes two-dimensionally arranged pixels;
wherein the changing the first threshold includes setting the first threshold for the object region detected by the detecting the object as higher than the first threshold for the regions other than the object region.

* * * * *